United States Patent
McGrath (10) Patent No.: US 9,797,384 B2
(45) Date of Patent: Oct. 24, 2017

(54) GRAVITATIONAL POTENTIAL ENERGY STORAGE

(71) Applicant: Ocean Renewables Limited, Duncannon (IE)

(72) Inventor: Brendan McGrath, Duncannon (IE)

(73) Assignee: OCEAN RENEWABLES LIMITED, Co. Wexford (IE)

( * ) Notice: Subject to any disclaimer, the term of this patent is extended or adjusted under 35 U.S.C. 154(b) by 0 days.

(21) Appl. No.: 14/770,512

(22) PCT Filed: Feb. 26, 2014

(86) PCT No.: PCT/EP2014/053759
§ 371 (c)(1),
(2) Date: Aug. 26, 2015

(87) PCT Pub. No.: WO2014/131806
PCT Pub. Date: Sep. 4, 2014

(65) Prior Publication Data
US 2016/0003224 A1    Jan. 7, 2016

(30) Foreign Application Priority Data

Feb. 27, 2013 (IE) .................................. S2013/0066

(51) Int. Cl.
*F03G 3/00* (2006.01)
*F03D 9/02* (2006.01)
*F03D 9/16* (2016.01)

(52) U.S. Cl.
CPC   *F03G 3/00* (2013.01); *F03D 9/16* (2016.05)

(58) Field of Classification Search
CPC . F03G 3/00; H02S 10/12; H02S 10/20; F03D 9/10; F03D 9/12; F03D 9/13; F03D 9/16
See application file for complete search history.

(56) References Cited

U.S. PATENT DOCUMENTS 8,901,758 B1 * 12/2014 Nix ........................... F03G 3/00
                                                               290/1 A
8,902,036 B2 * 12/2014 Kawai ..................... H01F 27/02
                                                                336/175

(Continued)

FOREIGN PATENT DOCUMENTS

| DE | 102007057323 | 6/2009 |
| WO | 2010049492 | 5/2010 |
| WO | 2013005056 | 1/2013 |

OTHER PUBLICATIONS

Machine Translation of WO 2010-049492 dated May 6, 2010.*
PCT International Search Report for International Application No. PCT/EP2014/053759 dated Oct. 28, 2014.

*Primary Examiner* — Alan B Waits
(74) *Attorney, Agent, or Firm* — Bond Schoeneck & King, PLLC; George McGuire (57) ABSTRACT

An energy storage system comprises a cable (13) and a mass 20 suspended from the cable (13) in a shaft (12). The cable (13) is attached to a winch 11 by which the mass may be raised in the shaft (12) to store potential energy, and the mass is lowerable in the shaft (12) to release the potential energy. The mass comprises at least two sections clamped together around the cable (13). More particularly, the system comprising a plurality of cables (13) and a plurality of multi-section masses each suspended in the shaft (12) by a respective cable (13), the masses being raised and lowered in synchronism in the shaft (12). The multi-section masses fit together side-by-side in the shaft (12) to form an overall cylindrical mass body, the multi-section masses each forming a quadrant of the cylindrical mass body.

10 Claims, 9 Drawing Sheets

(56) References Cited

U.S. PATENT DOCUMENTS

| | | | |
|---|---|---|---|
| 2004/0178634 A1* | 9/2004 | Eskandr | F03G 1/08 290/1 R |
| 2009/0193808 A1 | 8/2009 | Fiske | |
| 2010/0025160 A1* | 2/2010 | Bojji | B61B 7/00 185/33 |
| 2011/0241356 A1 | 10/2011 | Khoshnevis | |
| 2013/0270836 A1* | 10/2013 | Quraishy | F03G 3/00 290/1 A |
| 2015/0208519 A1* | 7/2015 | Kawai | H01F 27/02 336/90 |

* cited by examiner

GRAVITATIONAL POTENTIAL ENERGY STORAGE

CROSS REFERENCE TO RELATED APPLICATION

The present application relates and claims priority to, and is the United States National Phase application Under 35 U.S.C. 371 of Applicant's PCT Application No. PCT/EP2014/053759 filed 26 Feb. 2014 which in turn claims priority to Ireland Application No. S2013/0066, filed on 27 Feb. 2013, the entirety of each of which is hereby incorporated by reference.

BACKGROUND OF THE INVENTION

Technical Field

The present invention relates to a gravitational potential energy storage system capable of storing and regenerating energy by using a mass suspended from a cable.

Related Art

From the earliest days of the electric power system, energy storage has been considered an important technology for managing the grid. Today, the changing ways in which electric power is generated and used are making storage even more attractive than before. Energy storage can improve asset utilization, enhance the network reliability, enable more efficient use of base-load generation, and support a higher penetration of intermittent renewable generation. Large-scale stationary applications of electric energy storage can be divided in three major functional categories:

Power Quality Stored Energy: in these applications, is only applied for seconds or less, as needed, to assure continuity of quality power.

Bridging Power Stored Energy: in these applications, is used for seconds to minutes to assure continuity of service when switching from one source of energy generation to another.

Energy Management Storage Media: in these applications, is used to decouple the timing of generation and consumption of electric energy. A typical application is load levelling, which involves the charging of storage when energy cost is low and utilization as needed. This would also enable consumers to be grid-independent for many hours.

Although some storage technologies can function in all application ranges, most options would not be economical to be applied in all three functional categories.

Viable electrical power storage installations can therefore provide significant benefits for grid connected renewable energy sources which are totally reliant on the variable nature of wind, sun or ocean waves. When considering the current and projected installed capacity figures for wind power alone it is evident that its significance as a feasible global energy resource is now well established.

Electricity storage can enhance the value of energy from renewable generation in at least two fundamental ways. Storage can "firm-up" renewables' output so that electric power (kW) can be used when needed. Similarly electric energy (kWh) generated during times when the value is low can be "time-shifted" so that the energy can be sold when its value is high. One option would be to charge existing storage with electricity from wind generation as well as from the grid. Another would be to install additional storage at the renewable site.

Wind energy penetration refers to the fraction of energy produced by grid connected wind compared with the total generation capacity that is available to the grid. The limit for a particular grid will depend on the existing generating plants, pricing mechanisms, capacity for storage or demand management and other factors. An interconnected electricity grid will already include reserves of mostly carbon fuelled generating and transmission capacity to allow for equipment failures and the varying power generation produced by wind and other renewable sources.

In particular geographic regions, peak wind speeds may not coincide with peak demand for electrical power. A wind energy penetration figure can be specified for different durations of time. On an annual basis, as of 2011, few grid systems have penetration levels above five percent. To obtain 100% from wind annually requires substantial long term storage. On a monthly, weekly, daily, or hourly basis—or less—wind can supply as much as or more than 100% of current use, with the rest stored or exported.

Both long and short term stored energy increases the economic value of wind power since it can be deployed to displace higher cost generation during peak demand periods, these potential revenue gains can assist to offset the costs and losses of the storage system and allow base-load suppliers to run their plants more efficiently.

Energy storage exists in many electrical power systems. In the United States, about 2.5 percent of electricity that passes through the network has been stored. Pumped hydro facilities, the form of large-scale storage most familiar to utilities, represent most of this storage. Pumped hydro allows the storage of enormous quantities of energy, though it requires a huge initial investment.

However limitations for pumped storage installations would include the availability of the necessary geographical resources to viably achieve this together with the associated visual/environmental impacts.

Compressed air energy storage (CAES) is a less-widely implemented technology that uses off-peak renewable electricity to compress and store air, which can later be used to regenerate the electricity. Such techniques could be used to store renewable energy for convenient dispatch at later times.

Short-duration storage technologies such as ultra-capacitors and flywheels have uses in other applications, such as those in which power and energy requirements are not large but when the storage is expected to see a great deal of cycling. Such technologies can be used to address power-quality disturbances and frequency regulation, applications in which only a few kilowatts to megawatts are required for a few seconds or minutes.

A great deal of effort has gone into the development of electrochemical batteries. Utilities are familiar with lead-acid batteries which are extensively used for backup power in substations and power plants. In larger-scale applications, however, other battery chemistries such as sodium sulphur and vanadium redox flow batteries are more effective.

Flywheels might be used to provide minute-to-minute frequency regulation while large-flow batteries provide more large-scale ramping over several hours. Strategically placed sodium-sulphur batteries could ease bottlenecks in the distribution system through peak shaving, while reducing demand charges to customers. Ultra-capacitors placed at substations could mitigate the effects of momentary interruptions on distribution feeders.

SUMMARY OF THE INVENTION

According to the invention there is provided an energy storage system comprising a cable and a mass suspended from the cable in a shaft, the cable being attached to a winch means by which the mass may be raised in the shaft to store potential energy, and the mass being lowerable in the shaft to release the potential energy, wherein the mass comprises at least two sections clamped together around the cable.

Preferably the system comprises a plurality of cables and a plurality of multi-section masses each suspended in the shaft by a respective cable, the masses being raised and lowered in synchronism in the shaft.

Most preferably the multi-section masses nest together side-by-side in the shaft to form an overall mass body.

In the embodiment the overall mass body is cylindrical and there are four multi-section masses each forming a quadrant of the cylindrical mass body.

Each multi-section quadrant mass may comprise an inner section and an outer section together defining a conduit through which the cable passes and in which the cable is gripped.

Preferably circumferentially adjacent multi-section masses are fixed to oppositely wound cables.

Preferably, to store potential energy the or each multi-section mass is raised by power derived from a source of renewable energy, for example wind, wave or solar energy.

Alternatively, the or each multi-section mass may be raised by electrical or hydraulic energy.

The released potential energy may be converted to electrical or hydraulic energy.

According to the invention there is provided an energy storage system comprising a cable, and a mass, the mass comprising at least two sections.

The at least two sections preferably cooperate together.

Further preferably the mass comprises four quadrant units cooperating together.

Each quadrant unit is preferably connected to a separate cable.

Preferably each mass unit is in use disposed within a shaft.

Preferably adjacent quadrant units are fixed to an oppositely wound cable.

Preferably each quadrant unit comprises an inner section and an outer section fixed together to define a conduit for a cable.

Preferably the outer surface of the outer section has at least one hardened steel strip.

The invention further provides an energy storage system comprising a cable and a mass movable under gravity in a shaft, the cable attached to a winch means, said winch means connectable to a power supply to move the mass upwardly in the shaft, and the mass being lowerable in the shaft to generate power.

The downward movement of the mass in the shaft preferably generates electric power.

Preferably the power supply connectable to the winch means is provided by a renewable energy generating installation, for example a wind wave or solar energy installation.

According to another aspect of the invention there is provided a mass for use in an energy storage system comprising a plurality of mass bodies connected to a cable.

The mass bodies each preferably comprise four quadrants.

In relation to renewable generating installations such as Wind, Solar, Wave, this energy storage system may be located on site, or as close to the sources of power generation as would be practical. This may facilitate a more effective storage/production cycle of a given power source.

An optimum modular configuration may be arrived at for individual installations based on whatever constraints, geological, required storage capacity, planning permits, etc. that may exist with regard to the intended physical location. At specific locations storage capacity may then be further increased as required on this modular basis to facilitate expanded production/strategic investment.

A notable feature of this system would be its minimal visual impact on the environment within which it may be placed, this due to the main components of the storage system remaining underground at all times, with only the smaller components remaining at surface level. In a case where the provision of an industrial facility to house the necessary surface machinery was objectionable for any reason an underground bunker type construction may be provided to further reduce the overall visual impact.

Electrical energy that becomes available for storage may then be converted into gravitational potential energy by electro mechanically winding in the cable and its attached mass causing it to be raised vertically. In terms of the overall storage capacity available, this may be fully or fractionally utilised depending on the circumstances.

The resultant stored energy may then be held indefinitely in this way without storage losses, available until it is needed when at which point the suspended mass may be lowered in a controlled operation to commence regeneration of the electrical power. This regeneration process may be initiated in a matter of minutes to facilitate a very quick start to the dispatch of energy into the grid.

The rate at which the stored energy is discharged during the regeneration process may be varied. A much faster rate of discharge could be facilitated by a defined rate of increase in the controlled velocity of the mass during descent to achieve short cycling periods of the energy storage installation, which may result in an important commercial advantage.

A vertically subterranean shaft may be constructed for the purpose of making available the necessary height advantage through which the mass must be raised to facilitate the storage of gravitational potential energy.

Existing shafts may be used but it is probably unlikely that suitably located shafts with the required dimensions will be available in every situation. In any event it may make more commercial sense to have a totally bespoke system designed and constructed which may maximise commerciality in the long term.

The capital costs associated with the provision of the vertical shaft system may be offset over a period of decades, when properly planned, surveyed and constructed to a suitable standard this shaft may not require any maintenance for the duration of its use. As energy storage systems may become more of a standard feature going forward, the vertical shaft construction could conceivably appreciate as a company balance sheet asset in a similar way that more conventional commercial assets tend to increase in value with time.

A geological survey would be essential for the planning of the shaft construction, which would need to be carried out in hydrocarbon free conditions. The presence of water in the shaft may not be considered a problem as the mass can easily be made to function through this.

If the mass becomes immersed in liquid any change in density due to the effect of buoyancy may be compensated for by increasing the controlled descent velocity. This may be automatically achieved where the installation of "load cells" at key locations may constantly monitor and signal feed-back to the control system.

In terms of "Energy Management Storage Media" a fundamental component of any storage system would be its net storage capacity. The system described here when implemented in a modular sense may have the potential for medium to large storage capacity. The principle limitations associated with the storage capacity of this design would be the weight of the installed mass, and the vertical distance through which it can be moved, i.e. (E=mgh the equation for gravitational potential energy).

In consideration of this a design specification for any particular project may be focused on optimum parameters as regards the planning, dimensioning and execution of the vertical shaft together with the type and density of the material of which the intended mass may be comprised.

In relation to the vertical shaft, it can be possible with today's technology to drill a shaft to a depth of several thousand meters. With regard to shaft diameter it may be preferable to maintain a uniform dimension throughout its depth however when certain maximums have been reached, which may be specific to each project, optimum diameter of the shaft may need to be reduced. For example in terms of geological constraints these would be location specific and while they may be quantifiable they would tend to vary. The cost of specialised equipment such as large diameter drilling machinery, the specification of the shaft lining used, would also require careful consideration.

It may be established numerically that for a given depth of vertical shaft there is an optimum depth ratio to the length of the suspended mass, at a point where this ratio is exceeded the storage capacity suffers a consequence of diminishing returns this ratio may numerically demonstrate that up to half of the available depth of the shaft may be occupied by the suspended mass.

To optimise the available vertical depth of the shaft it may be practical to use a high density material in order to reduce as much as possible the volume to weight ratio of the space that the mass would occupy in the shaft. Options for the material to be used in the construction of the mass may include Lead due to its high density of 11 tons per meter^3, its properties which make it easy to work with especially with regard to casting and also due to its resistance to corrosion. While the initial cost of this material would be high its value may tend to appreciate over time as a commodity which would not significantly deteriorate over the life of the storage installation and consequently for an extended period be also considered an asset.

BRIEF DESCRIPTION OF THE DRAWINGS

An embodiment of the invention will now be described by way of example with reference to the accompanying drawings, in which.

DETAILED DESCRIPTION

Referring now to the drawings wherein similar numerals have been used to indicate like parts, there is shown therein an energy storage system generally indicated at 10 according to the invention.

Figure 1:
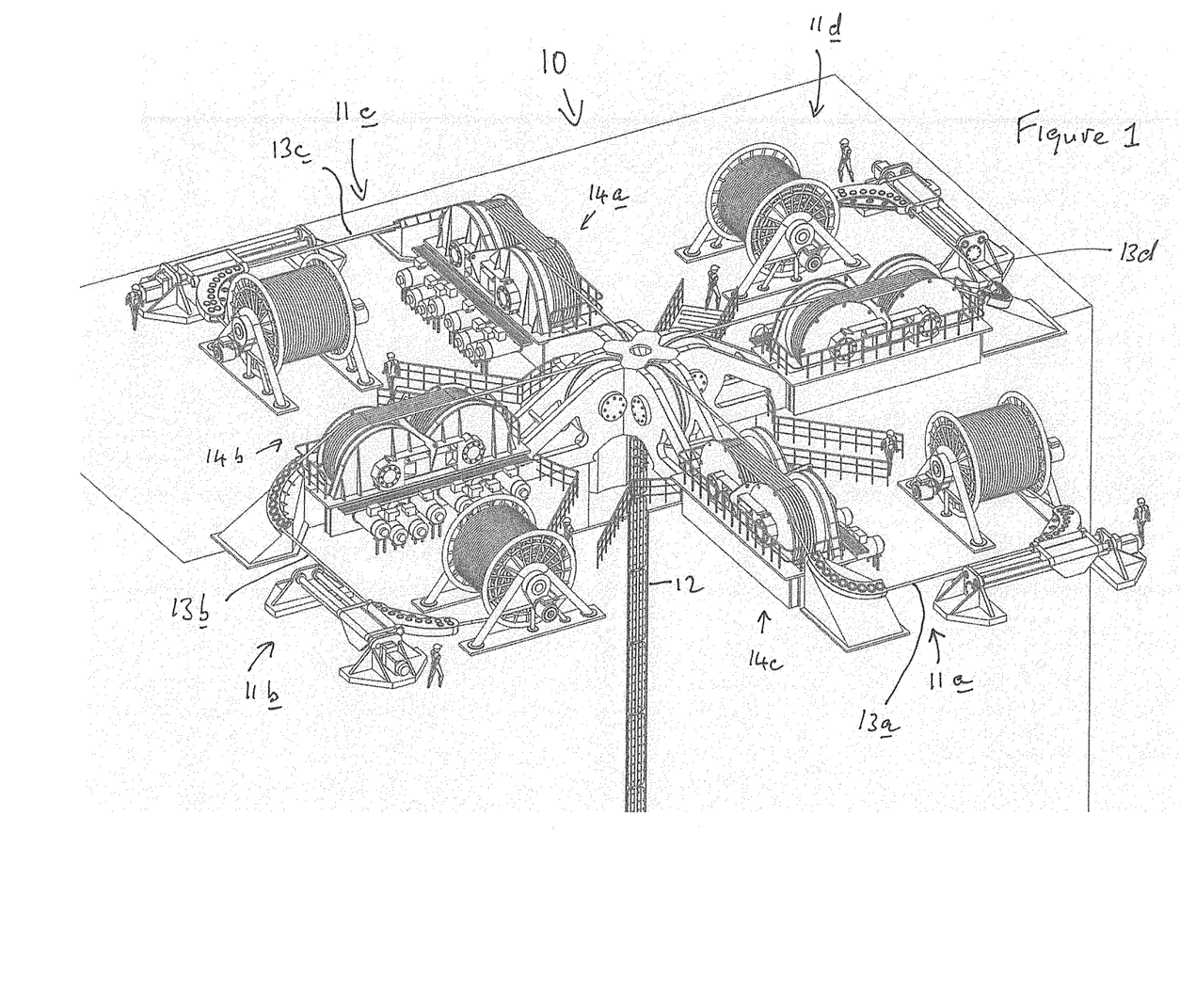
FIG. 1 is a schematic view of an embodiment of an energy storage system according to the invention.
Figure 2:
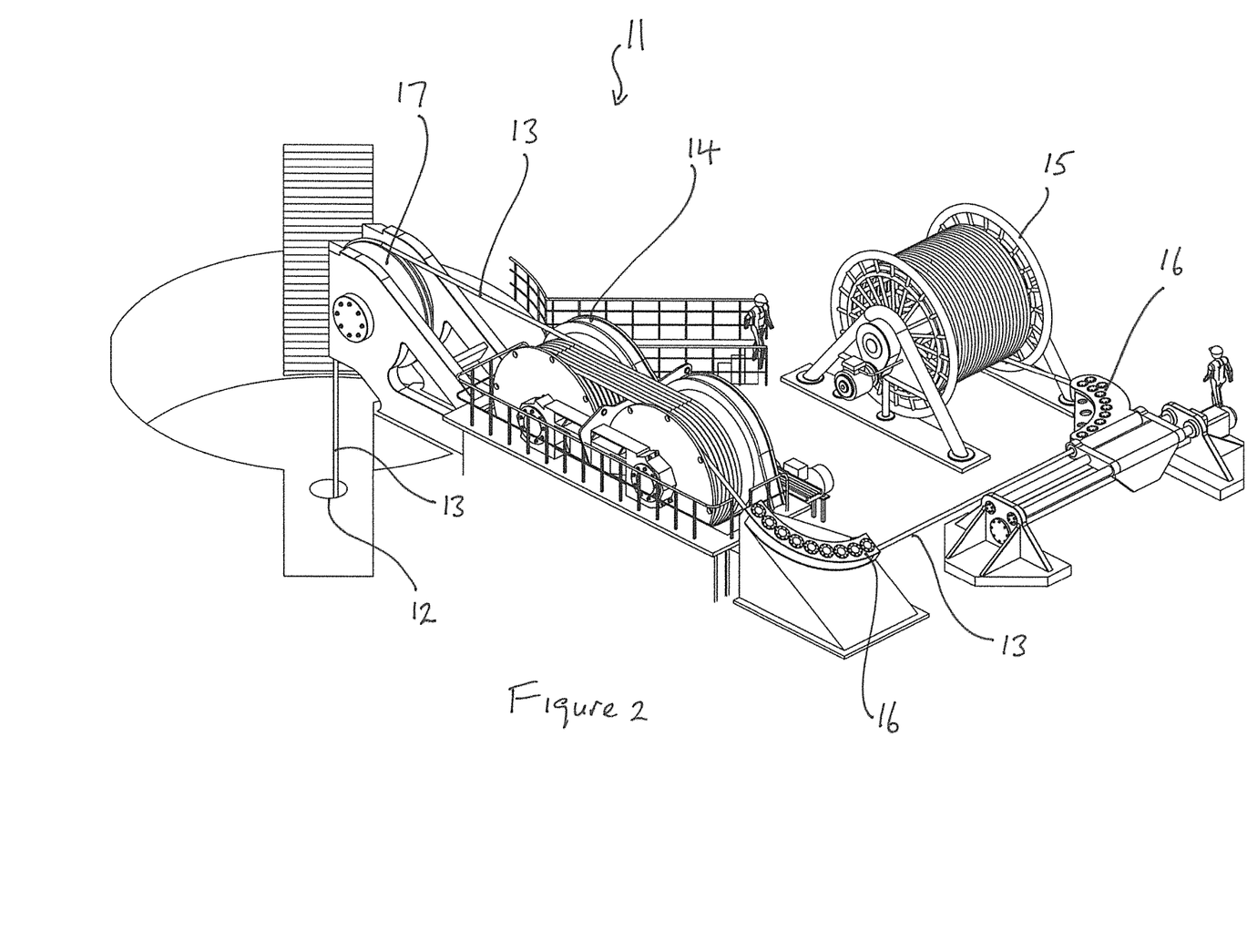
FIG. 2 is a schematic view of a winch unit and shaft of the system of FIG. 1.
Figure 3:
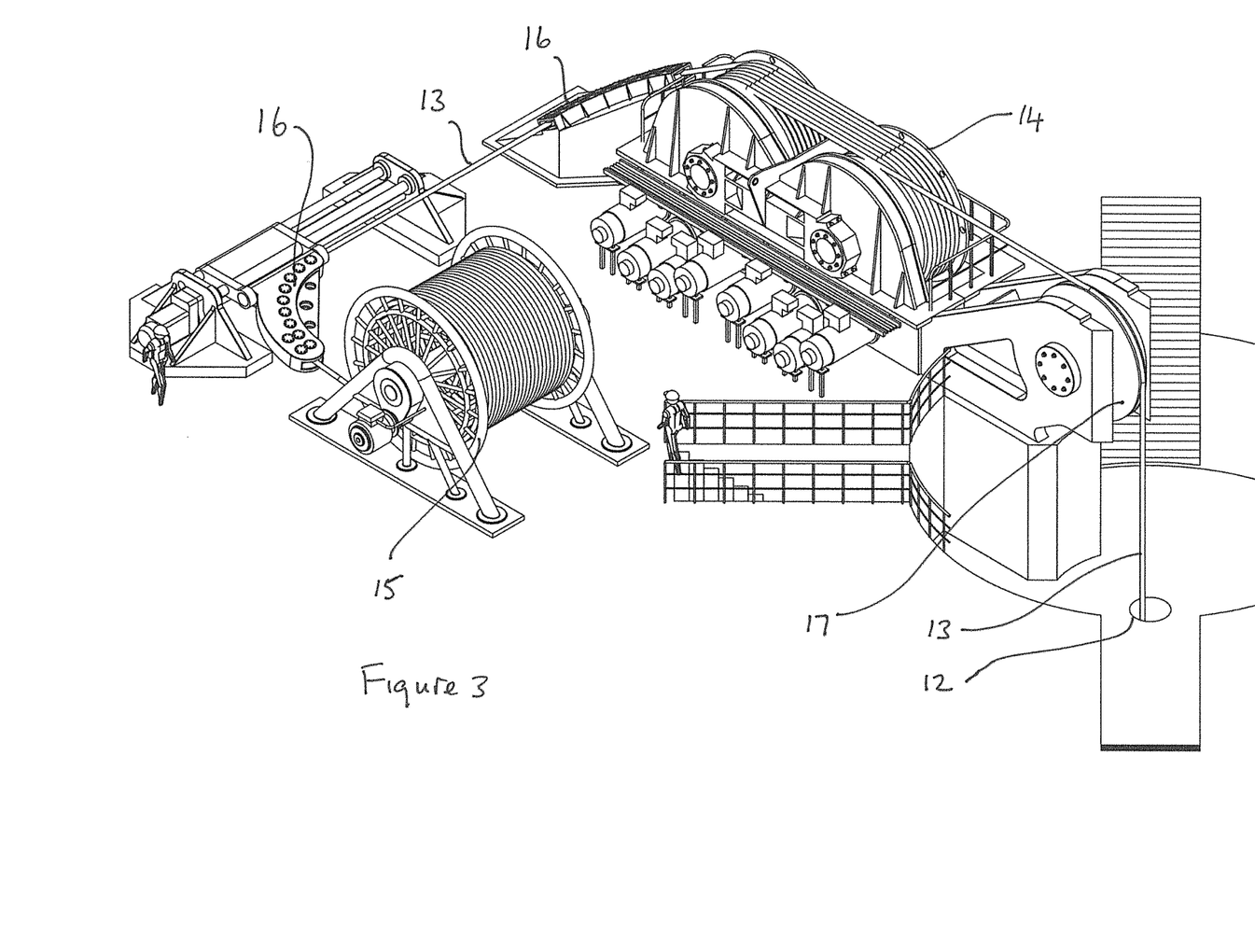
FIG. 3 is another schematic view of the winch unit and shaft of FIG. 2.
Figure 4:
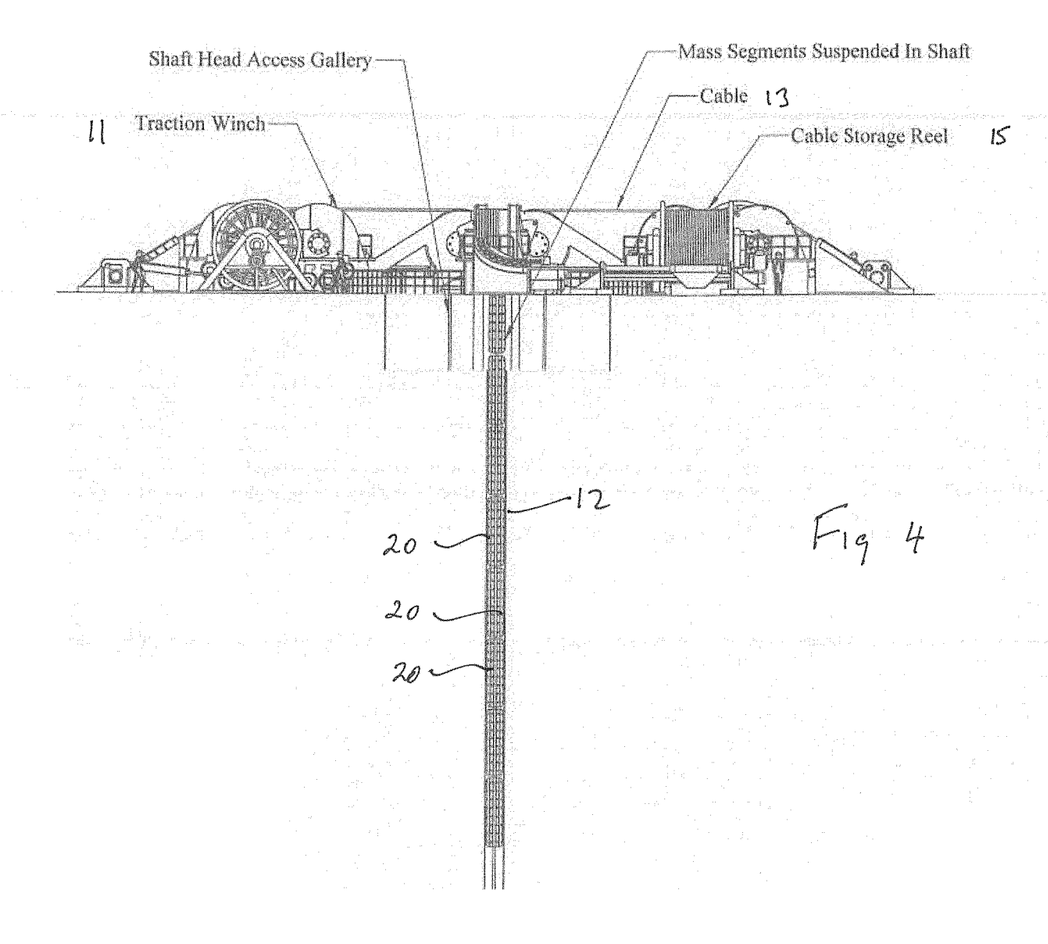
FIG. 4 is a schematic cross section view of the apparatus of FIG. 1 and a shaft.
Figure 5:
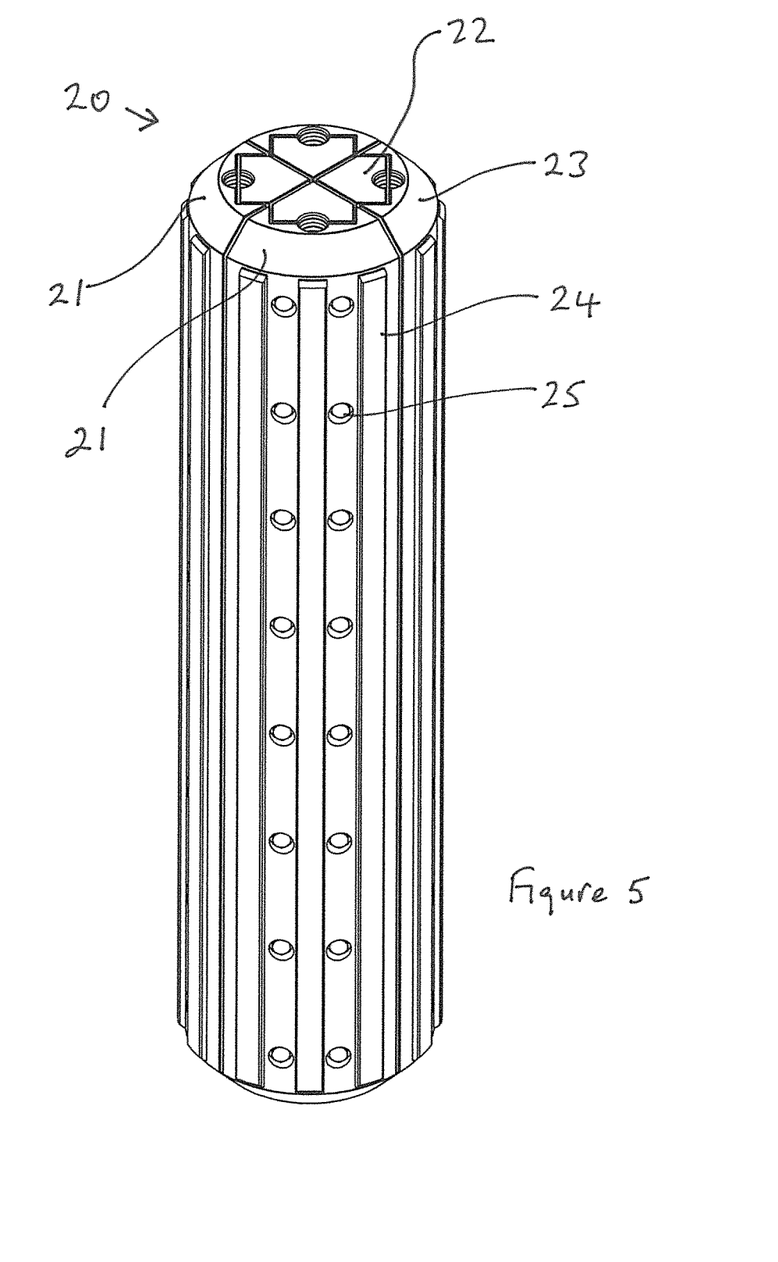
FIG. 5 is a perspective view of a mass body according to the invention.
Figure 6:
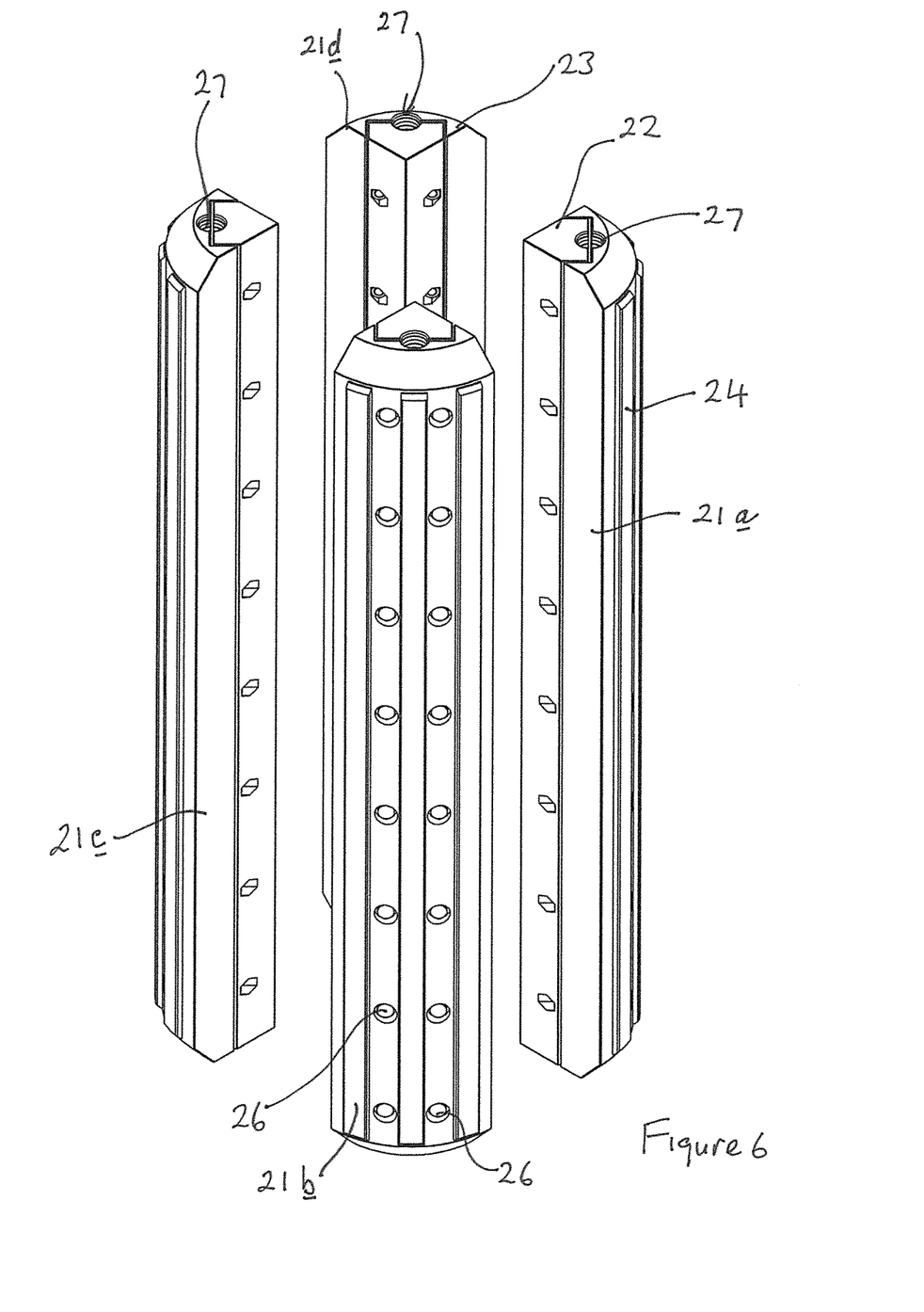
FIG. 6 is a perspective view of a mass quadrant unit of the mass quadrant unit of the body of FIG. 5.
Figure 7:
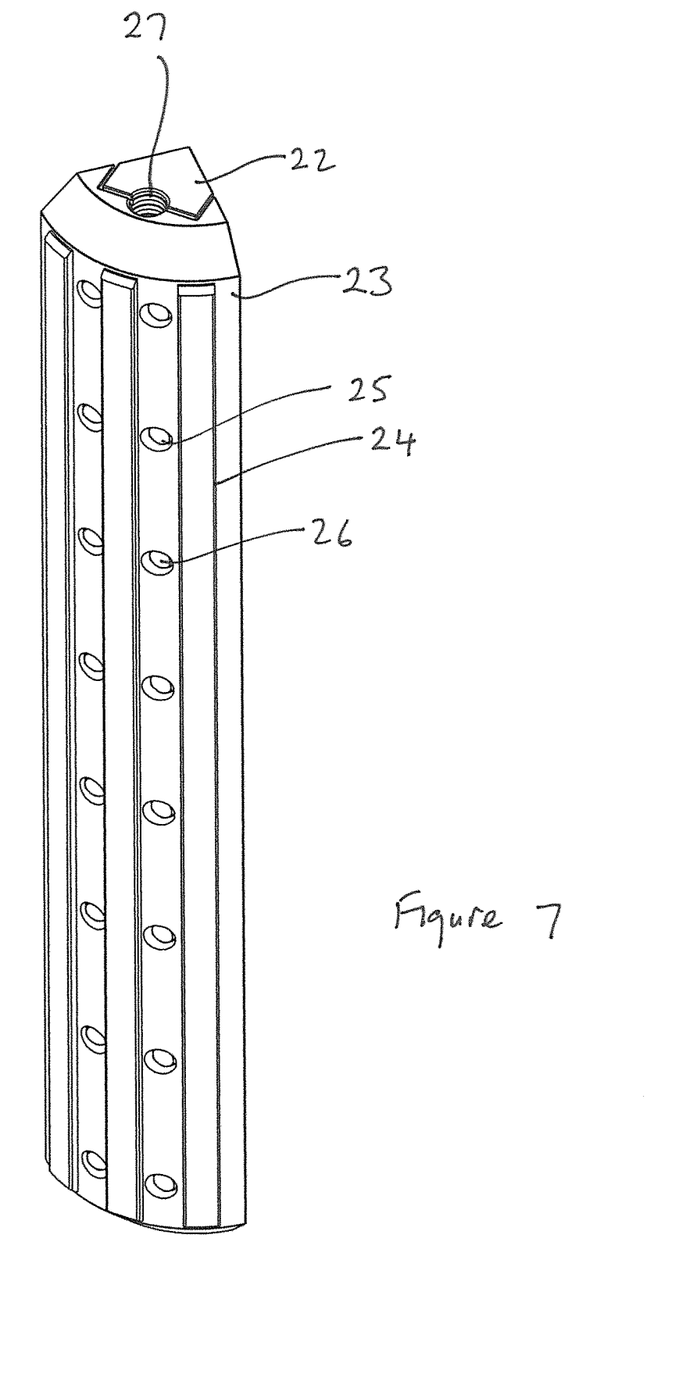
FIG. 7 is a perspective view of one mass quadrant unit of FIG. 6.
Figure 8:
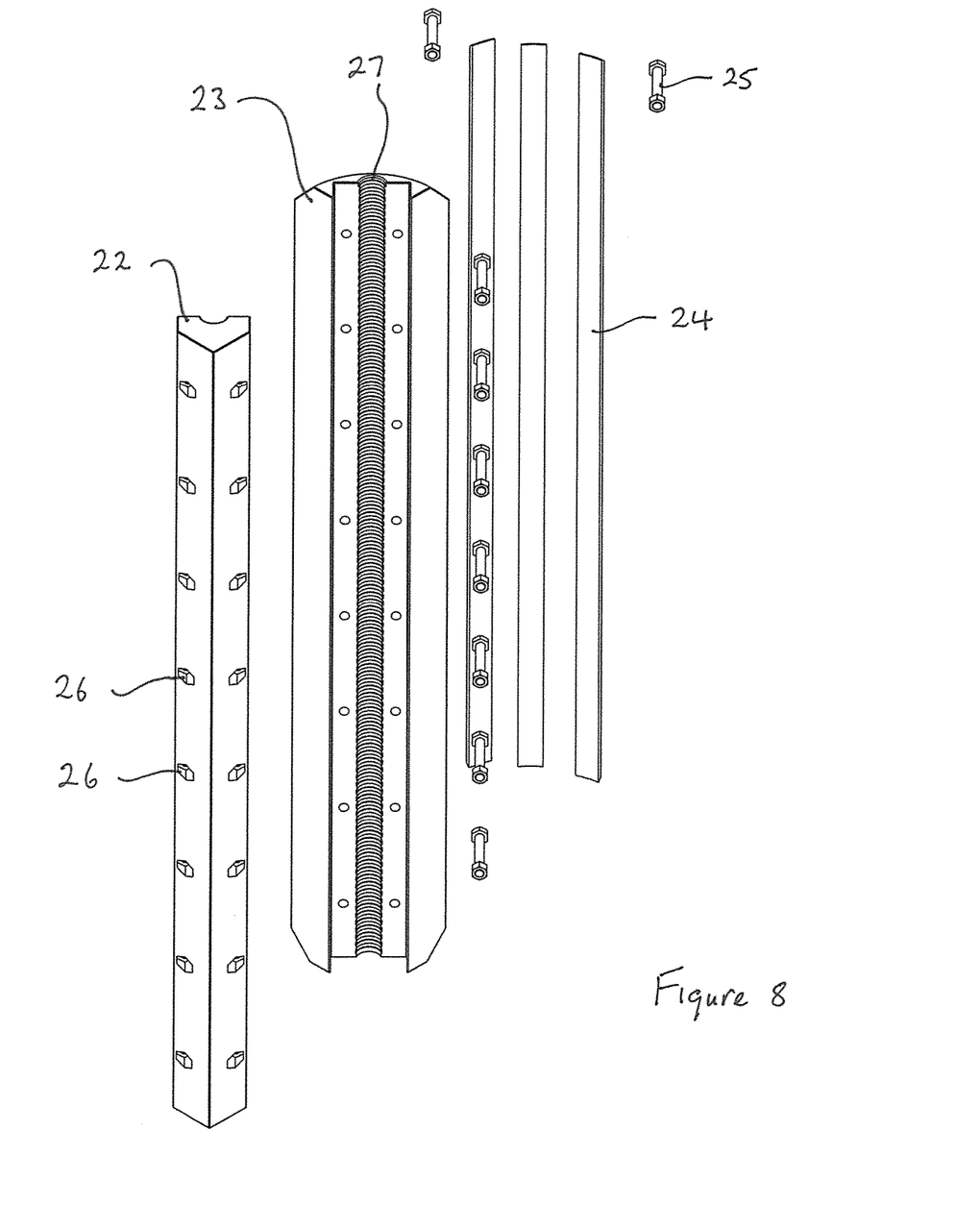
FIG. 8 is an exploded perspective view of the mass quadrant unit of FIG. 7.
Figure 9:
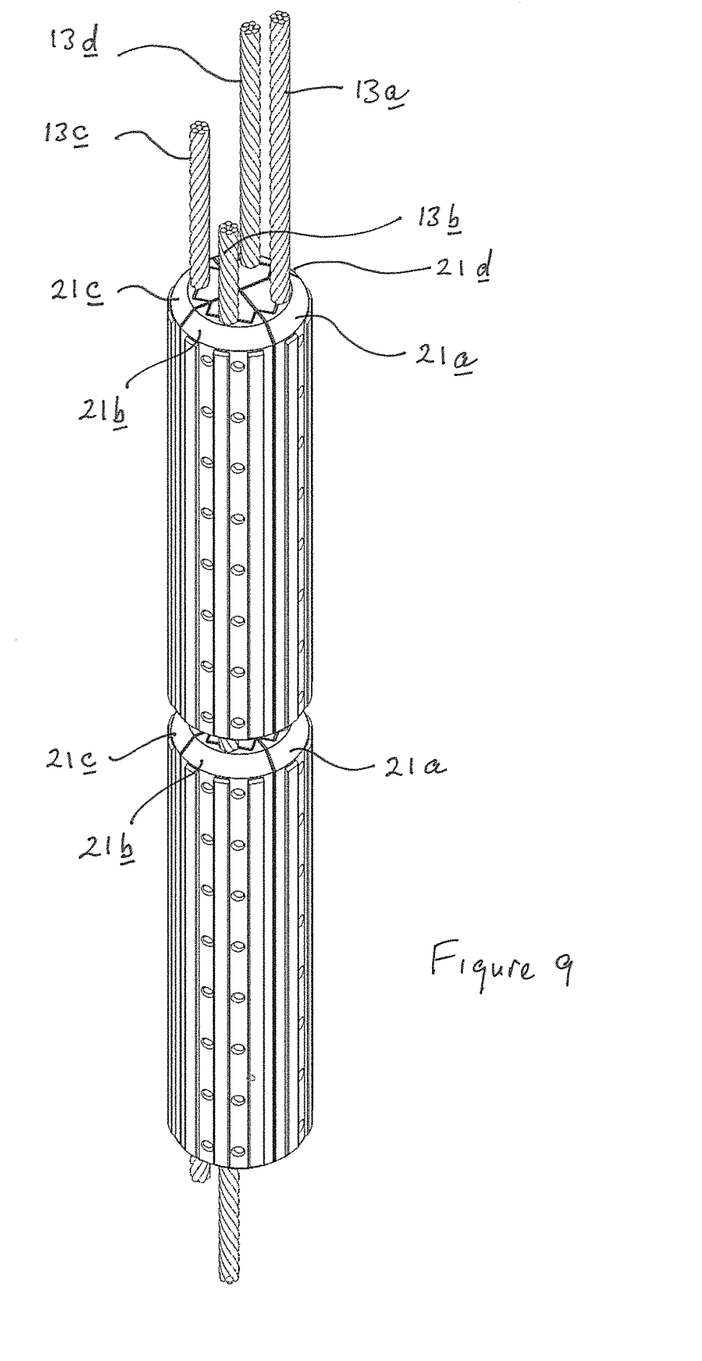
FIG. 9 is a perspective view of a number of the mass bodies and quadrant units fixed on respective cables.

The energy storage system 10 comprises a plurality of traction winch units 11*a*, 11*b*, 11*c* and 11*d* disposed around a purpose-build or suitable pre-existing substantially vertical subterranean shaft 12. Each winch unit 11*a*-11*d* comprises a steel cable 13*a*-13*d* engaged on a fraction type winch system 14 and has a storage reel 15. Spooling guides 16 lead each cable 13*a*-13*d* from a respective winch system 14 to an associated storage reel 15. Respective leading sheaves 17 guide the cables 13 into the shaft 12 to support a series of composite mass bodies 20 spaced vertically one above the other in the shaft. A series of motor-generators 18 (FIG. 3) are provided to either drive the traction winches 14 in a forward direction to raise the mass bodies (20) in the shaft (12) to store potential energy, or to generate power as the winches 14 are driven in reverse by the mass bodies 20 falling in the shaft 12, as will be described below.

Referring now to FIGS. 5-9, there is shown a composite mass body 20 which is attached to the four cables 13 and suspended in the shaft 12. Each mass body 20 comprises four quadrant units 21 which co-operate or nest together side by side in the shaft to form the overall composite mass body 20. Each quadrant unit 21 comprises an inner section 22 and an outer section 23. The outer surface of the outer section 23 has a plurality of hardened steel strips 24 fixed thereon. The inner and outer sections are clamped together by a means of bolts 25 engaging in corresponding holes 26 to define a vertical cylindrical recess or conduit 27 to accommodate a respective steel cable 13. The cable 13 passes through and is gripped by the conduit 27 so that the quadrant unit 21 is clamped to the cable.

The quadrant units 21*a*, 21*b*, 21*c* and 21*d* (FIG. 6) are mounted on respective cables 13*a*, 13*b*, 13*c* and 13*d* in the manner aforesaid so that the circumferentially adjacent cables are of the opposite right and left hand "lay". The overall arrangement (FIG. 9) is such that a plurality of quadrant units 21*a*-21*d* are mounted on and spaced one above the other on a respective cable 13*a*-13*d*, each set of quadrant units 21*a*-21*d* being horizontally aligned to form the composte mass bodies 20. The cables 13*a*-13*d* are attached to the respective traction winches 11*a*-11*d*.

A particular example of a gravitational potential energy storage system that can be numerically demonstrated to have a gross capacity of just over 5 MWh is disclosed as follows.

A vertical shaft 12 may be constructed having a depth of 1,700 meters. This shaft 12 may be lined with suitable material to provide structural stability to the shaft wall throughout its projected lifespan, the finished internal diameter of the shaft may be 850 mm.

The total required mass being used to store a 5 MWh capacity in this shaft may be in the order 1,600.00 tonnes.

The mass units 21*a*-21*d* may be suspended in the shaft in 4 separate "lengths" each of 400 tonnes.

Each "length" is suspended on a separate steel cable, i.e. in this example there are four separate cables 13 required to suspend the total mass of 1,600 tonnes in the shaft.

Each steel cable 13*a*-13*d* may have a diameter of 92 mm each with a minimum breaking force of 670 tonnes.

For ease of construction installation and operation each "length" is assembled in modular units to make up the total of 400 tonnes in each case.

These modular units may be cast using Lead and may be designed to be individually held in position on their respective steel cables by means of each module having been fabricated in two parts 22, 23 through a vertical cross section, the resultant two parts may bolt together around the cable in a manner that can exert perpendicular pressure upon the cable to which it is attached.

Each modular unit 21a-21d may be manufactured so as to form, when fixed in position on the cable, a quarter segment of a vertical cylindrical section 21 that may have a total diameter of 740 mm.

Each modular unit 21 may be 2.9 meters long and fitted along its length with vertically aligned hardened steel "protective strips" 24. The "protective strips" may serve to isolate the Lead material of each "modular unit" from contacting with the shaft lining and also may reduce friction.

The radius of each modular unit 21 may be 370 mm in total, including tolerances which may provide an element of dynamic flexibility when moving in the vertical shaft.

Each individual length of "modular units" which may form 400 tonnes of mass, together with its respective steel cable will be independently attached to "Traction Winch" type hoisting and lowering equipment, i.e. a total of four "Traction Winches 14a-14d" may be employed in this example.

Each "Traction Winch" may have its own cable storage reel 15 with sufficient capacity for the required function of the system.

The four "Traction Winches" may have control systems facilitating them to operate in a synchronous manner with respect to each other, throughout the cycle of storage and regeneration of energy.

The "modular units" 21 that comprise the "lengths" of the 400 tonne masses may accordingly be aligned horizontally in the shaft, and may be raised and lowered as one unit by the four synchronised "Traction Winches".

In this manner they form cylindrical sections vertically "stacked" along the lengths of the four steel cables. There may be a gap of 150 mm allowed between each aligned cylindrical section to facilitate flexibility during operation.

A total of thirty five cylindrical sections 21 may be mounted in this manner, resulting in the total mass required of 1,600 tonnes being achieved, and culminating in the total installed length of the mass to be 427 meters overall, not accounting for any torsional elasticity that may occur in the cables.

The total combined mass in the shaft may increase with depth due to the additional mass of the lengthening cable, load cells may detect this and the control system may react to impede the rate of descent in order to stabilise the rate at which power is being discharged.

If the modular weight system is configured in the manner described there may be a total of 413 tons of suspended mass on each length of cable at its maximum depth in the shaft, this would include the weight of the 92 mm steel cable 13 at 36 kg's per meter.

Mounted at surface ground level and positioned over the shaft so as to facilitate their attachment to their respective steel cables may be four "Traction" type winches 14a-14d.

The four "Traction Winches may be installed to have equal spacing relative to each other of 90 degrees around the shaft opening. A "leading roller" may be aligned at the shaft opening to guide the transfer of the cable to and from the "Traction Winch" during energy storage and dispatch. Load cells may be positioned in the shafts of the rollers for the acquisition of data by the control system.

Although each "traction winch" may be attached to its own cable length and mass, the collective installation of "traction winches" may control the vertical movement of the total mass jointly in a synchronised mode of operation.

Rotational steel cable 13 is composed of many cores of smaller diameter steel wire which is wound together in a manufacturing process producing either a left or right handed pitch, called a "lay". To offset any rotational forces that may be present in the cable as a result of this, the four cables may be installed with an alternating sequence of right and left handed "lays" to induce a contra torsional component during their collective operation.

The sequence of energy storage may be initiated by raising the mass vertically in the shaft, the greater the distance that the mass is raised during this sequence can result in the greater the amount of energy stored. This sequence may be either partly or wholly carried out, depending on the quantity of energy being made available for storage, the maximum capacity of the system being the maximum available height/depth of the shaft.

The physical process of raising the mass may be accomplished when each of the "Traction Winch" driving systems 14 are provided with power from a source of energy that is required to be stored. The type of power that may be fed to the "Traction Winch" driving systems may be any combination of electric, hydraulic etc. consequently the driving motors may be matched to be either electric or hydraulic accordingly depending on the designated medium.

In order to provide each "Traction Winch" 14 with the means by which they maybe enabled to raise their respective masses, each individual "Traction Winch" may be driven with at least one electrically or hydraulically powered motor 18 coupled to appropriate gearing which may facilitate the cable being drawn around a system of sheaving rollers, this being configured specifically to exclude loss of traction of the cable during the energy storage sequence.

The driving motors 18 may be directly coupled to the running gear of the "Traction Winches" or coupled via rotational shafting.

All "Traction Winch" driving motors may be configured to facilitate a synchronised process of lifting the combined attached masses vertically in the shaft when they might be powered with energy from various sources for the purpose of conversion to stored potential energy.

Each individual "Traction Winch" may be fitted with at least one electrical generator 18 or hydraulic pump.

Each individual "Traction Winch" electrical generator or hydraulic pump component may be directly or indirectly coupled to the "Traction Winch" running gear so as to form a power take off drive for these components.

Accordingly in order to permit the stored energy to be reactivated a controlled sequence may be initiated whereby these components may be driven to produce either electrical power or pressurised fluid during the rotation of the winch.

The production of kinetic energy during the controlled lowering of the mass 21 may be transmitted via the cables drawn around the "Traction Winch" sheave rollers thereby causing rotation and useful torque which may in turn be converted into electrical energy or hydraulic pressure.

It may suit that the driving and generating components of the "Traction Winches", whether they may be electric or hydraulic motors, would be configured to act as dual purpose components. In this way the electric motors would also act as electrical generators and accordingly the hydraulic motors would act as hydraulic pumps.

It may also be convenient for specific purposes that any electric or hydraulic combination of these components may be installed to each "Traction Winch" unit. This scenario would for example enable a "Traction Winch" during a storage time sequence to be driven hydraulically whilst, in a following time sequence, being able to reactivate stored energy electrically or vice versa.

The storage and reactivation of energy may be processed using any form of suitable energy from any appropriate source. This may typically be alternating current, direct current, hydraulic pressure circuits and pneumatic systems. The system may successfully convert any type of energy which might be configured to raise the mass partly or wholly in the shaft to potential energy thereby resulting in what may effectively be an indefinite storage period without losses.

A mechanical friction type master brake may fitted to the winch system which when applied will have sufficient capacity to indefinitely halt any downward movement of the suspended mass.

The master brake will be subject to a "normally on" configuration to immobilise the suspended mass in the event that the control system is subjected to total power loss.

A series of sensors may be installed to facilitate a multi-function control system which, inter alia, may be configured to detect the capacity level of the stored energy within the system at any given moment. The controller can then support the diversion of available energy to any vacant storage capacity by further raising the mass using this energy.

Each "Traction Winch" may be driven by motors which are capable of functioning at various levels of power supply inputs and additionally or alternatively be provided with suitable variable gearing at their output shafts. This would facilitate the energy storage process when sources are producing minimum rates of power, while accepting a variance of the velocity at which the mass is being raised. In this way energy that has been stored with relatively low rates of power during a certain time sequence may be regenerated at a much greater rate of dispatch during a shorter time sequence.

Each "Traction Winch" may be coupled to drive generators, pumps, or mechanical systems capable of producing regenerated power at various output levels and additionally or alternatively be provided with variable gearing to their input shafts during a sequence of energy regeneration. Power output levels may consequently be regulated in order to dispatch the stored energy capacity during a selection of time periods. To enable this function a system to control electronic or mechanical components may be provided as a means of varying the allowable time periods for capacity discharge by varying the average descent velocity of the mass.

The control system may regulate the average descent velocity of the mass in a selection of pre-programmed stages, or steps, or by means of a system of infinite variance between a set of maximum and minimum values. It may be commercially expedient at times, to rapidly dispatch stored energy to an electrical grid, especially during circumstances where energy may be continuously available for storage on a routine basis.

The control system function of regulating the mass descent velocity may be accomplished by means of generator load sensing, whereby the electrical load on the generator may be increased or decreased electronically, momentarily causing additional consequent loading on the "Traction Winch" to reduce the pay-out velocity of the cable.

Additionally or alternatively the regulation of the mass descent velocity may be achieved by means of a second stage generator or pump being coupled to a power take off point on the low torque end of the "Traction Winch" output gearing. This second stage generator or pump may be less powerful than the primary generator or pump installations. This second stage component may also be regulated to provide a regenerative braking system during the stored energy retrieval sequence.

Regenerative attenuation of the mass descent velocity may be of significant importance in terms of the overall efficiency of the system.

The control system may be software based using analogue and digital methods to acquire data from a number of various types of sensors, encoders, transducers, load cells etc.

The invention is not limited to the embodiments described herein which may be modified or varied without departing from the scope of the invention.

What is claimed is:

1. An energy storage system comprising at least four cables (13) and at least four multi-section masses (21) each suspended by a respective cable (13) in a shaft (12), the cables (13) being attached to a winch means (11) by which the multi-section masses (21) may be raised in synchronism in the shaft (12) to store potential energy, and the multi-section masses (21) being lowerable in synchronism in the shaft (12) to release the potential energy, wherein each multi-section mass (21) comprises at least two sections (22, 23) clamped together around the cable (13), wherein the multi-section masses (21) nest together side-by-side in the shaft (12) to form an overall composite mass body (20), and wherein the multi-section masses (21) comprise circumferentially adjacent multi-section masses (21), wherein the circumferentially adjacent multi-section masses (21) are fixed to only oppositely wound cables (13).

2. An energy storage system as claimed in claim 1, wherein each cable (13) is attached to a respective winch means (11).

3. An energy storage system as claimed in claim 1, wherein the composite mass body (20) is cylindrical and there are four multi-section masses (21) each forming a quadrant of the cylindrical mass body.

4. An energy storage system as claimed in claim 3, wherein each quadrant (21) comprises an inner section (22) and an outer section (23) together defining a conduit (27) through which the cable (13) passes and in which the cable (13) is gripped.

5. An energy storage system as claimed in claim 1, wherein there are a plurality of composite mass bodies (20) suspended by the cables (13) one above the other in the shaft (12), each mass body being spaced from the adjacent mass body(s).

6. An energy storage system as claimed in claim 1, wherein the outer surface of each multi-section mass (21) of the composite mass body (20) has at least one hardened steel strip (24).

7. An energy storage system as claimed in claim 1, wherein to store potential energy each multi-section mass (21) is raised by power derived from a source of renewable energy.

8. An energy storage system as claimed in claim 7, wherein the source of renewable energy comprises wind, wave or solar energy.

9. An energy storage system as claimed in claim 1, wherein to store potential energy each multi-section mass (21) is raised by electrical or hydraulic energy.

10. An energy storage system as claimed in claim 1, wherein the released potential energy is converted to electrical or hydraulic energy.

* * * * *